W. L. DEMING.
PUMP HOLDER.
APPLICATION FILED JULY 12, 1912.
1,076,488.
Patented Oct. 21, 1913.
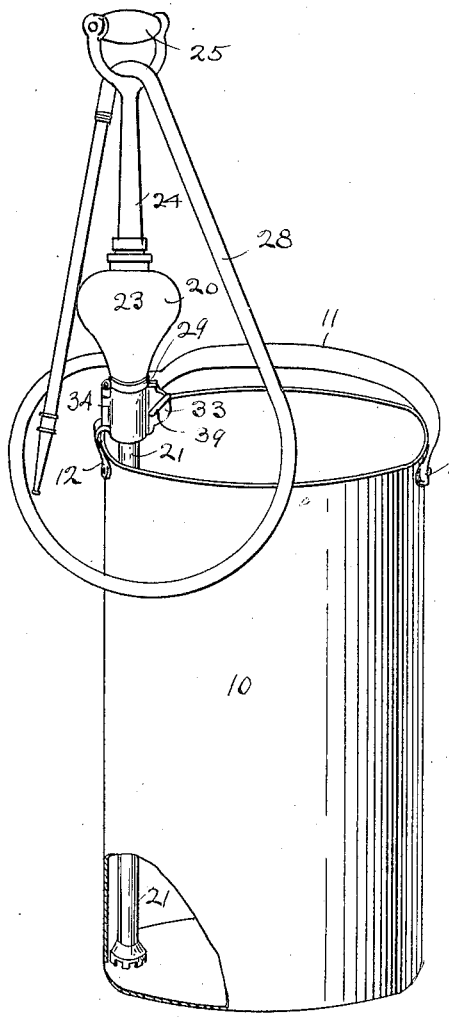
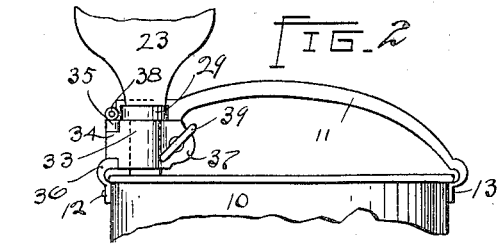
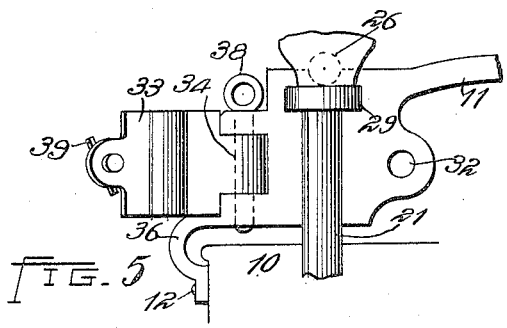
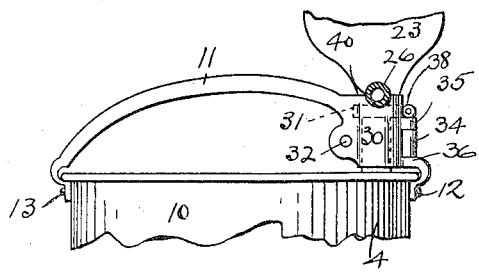
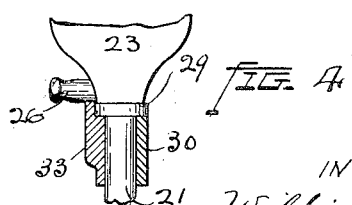
WITNESSES=
Oliver M. Kappler
Gertrude K. Smith
INVENTOR
William L. Deming
BY Albert H. Bates,
ATTORNEY

UNITED STATES PATENT OFFICE.

WILLIAM L. DEMING, OF SALEM, OHIO, ASSIGNOR TO THE DEMING COMPANY, OF SALEM, OHIO, A CORPORATION OF OHIO.

PUMP-HOLDER.

1,076,488. Specification of Letters Patent. Patented Oct. 21, 1913.

Original application filed June 28, 1911, Serial No. 635,878. Divided and this application filed July 12, 1912. Serial No. 703,997.

*To all whom it may concern:*

Be it known that I, WILLIAM L. DEMING, a citizen of the United States, residing at Salem, in the county of Columbiana and State of Ohio, have invented a certain new and useful Improvement in Pump-Holders, of which the following is a full, clear, and exact description, reference being had to the accompanying drawings.

The object of this invention is to provide simple and effective mechanism for holding a hand pump within a suitable vessel.

More particularly, the invention comprises a combined bail for carrying the vessel or tank, and a holding device coacting with the bail for rigidly holding the pump thereto with its barrel extending into the vessel.

The invention includes also the specific form of combined pump holder and bail illustrated in the drawings hereof and hereinafter more fully explained.

The invention is an improvement on the holding device shown in my prior Patent No. 916,920 granted March 30, 1909, and is a division of my prior Patent No. 1,038,895.

In the drawings, Figure 1 is a perspective view of a portable bucket and pump held by my retaining device; Fig. 2 is an enlarged front view of the upper portion of the bucket and bail and the pump clamp carried thereby; Fig. 3 is a rear view of the same parts; Fig. 4 is a detail, being a vertical section along the axis of the pump barrel; Fig. 5 is an enlarged detail showing the clamp in an open position.

As shown in the drawings, 10 represents any suitable bucket or portable vessel, and 11 a suitable bail by which the same may be carried. This bail is shown as extending across the vessel and secured to diametrically opposite points thereof near its upper end as indicated at 12 and 13.

20 indicates the pump. This is shown as having a barrel 21, adapted to stand within the vessel and extend substantially to the bottom thereof, and an air chamber 23 above the barrel. Within the air chamber and barrel operates a reciprocable plunger 24 having a handle 25. Leading from the air chamber is a discharge tube 26 (Fig. 4) on which there is secured a suitable hose 28.

My clamp engages the barrel of this pump to hold it removably but rigidly on the bail with the barrel extending into the tank, as will now be fully described.

At the base of the air chamber 23, where it joins the pump barrel, is an outwardly projecting annular shoulder 29. The bail is formed with a substantially semi-cylindrical portion 30 which is adapted to snugly embrace one side of the pump barrel. Within the semi-cylindrical seat thus provided is a peripheral groove 31 adapted to receive substantially half of the projecting shoulder 29. On the opposite side of the pump barrel is a clamp 33 which likewise has a semi-cylindrical body. At one edge this clamp has an ear 34 which projects between an ear 35 of the bail and the main body of the bail at 36 adjacent to the point 12 where it is secured to the bucket. A pin 38 passing through the ears and into the portion 36 hinges the clamp to the bail. A suitable thumb-screw 39 passes through an opening in an ear 37 of the clamping plate 33 and screws into a threaded opening 32 (Fig. 3) in the bail. The bail plate 30 is provided near its upper edge with a notch 40 in which rests the discharge tube 26.

From the above description it will be seen that when the thumb screw 39 is tightened, the pump is clamped in place. It cannot move up or down, due to the projecting shoulder in the groove, nor twist in the bearing, the discharge tube in the recess preventing any twisting movement. Accordingly, the pump is held in the desired position. By screwing out the thumb-screw, however, the clamp plate may be turned back and the pump, with the hose, entirely removed, whenever desired.

It will be seen that my clamping device holds the pump to the bucket so that the two may be carried about as a unit; moreover, the operator may thus use one hand to hold the bucket and pump in place by bearing down on the bail, while his other hand manipulates the pump. The combined tank and pump is thus admirably adapted for various uses where a portable pumping structure is desired, as for spraying trees, extinguishing fires, etc. The simple removal of the set screw 39 enables the pump to be conveniently removed from the vessel, whenever desired, for purposes of cleaning or otherwise.

Having thus described my invention, what I claim is:

1. In an apparatus of the class described, the combination of a portable tank, a rigid bail therefor, a pump having a barrel, an operating handle and a laterally directed discharge tube, said pump being adapted to stand with its barrel in the tank, a clamp for the barrel carried by the bail and consisting of a portion of the bail and a clamping plate, said clamp embracing the pump barrel and having a recess receiving the discharge tube and thereby preventing twisting of the barrel.

2. In an apparatus of the class described, the combination of a portable tank, a rigid bail therefor, a pump having a barrel, an operating handle and a laterally directed discharge tube near the top of the barrel, said pump being adapted to stand with its barrel in the tank, a clamp for embracing the barrel carried by the bail and consisting of a portion of the bail and a hinged clamping plate, a shoulder on the pump coacting with a recess in the clamp to prevent longitudinal movement of the pump, said clamp having a recess receiving the discharge tube and thereby preventing changing of the relative position of the discharge tube.

In testimony whereof, I hereunto affix my signature in the presence of two witnesses.

WILLIAM L. DEMING.

Witnesses:
ALBERT H. BATES,
J. B. HULL.

Copies of this patent may be obtained for five cents each, by addressing the "Commissioner of Patents, Washington, D. C."